(12) United States Patent
Jin

(10) Patent No.: US 12,117,217 B1
(45) Date of Patent: Oct. 15, 2024

(54) GAS-LIQUID SEPARATOR AND COMPRESSION SYSTEM

(71) Applicant: ZHEJIANG DUNAN ARTIFICIAL ENVIRONMENT CO., LTD., Zhejiang (CN)

(72) Inventor: Hailong Jin, Zhejiang (CN)

(73) Assignee: ZHEJIANG DUNAN ARTIFICIAL ENVIRONMENT CO., LTD., Zhejiang (CN)

( * ) Notice: Subject to any disclaimer, the term of this patent is extended or adjusted under 35 U.S.C. 154(b) by 0 days.

(21) Appl. No.: 17/768,485

(22) PCT Filed: Aug. 12, 2020

(86) PCT No.: PCT/CN2020/108666
§ 371 (c)(1),
(2) Date: Apr. 13, 2022

(87) PCT Pub. No.: WO2021/073230
PCT Pub. Date: Apr. 22, 2021

(30) Foreign Application Priority Data

Oct. 15, 2019 (CN) .......................... 201910980192.X

(51) Int. Cl.
*F25B 43/00* (2006.01)
*F25B 1/00* (2006.01)

(52) U.S. Cl.
CPC .............. *F25B 43/003* (2013.01); *F25B 1/00* (2013.01); *F25B 2400/23* (2013.01)

(58) Field of Classification Search
CPC .. F25B 43/003; F25B 2400/23; F25B 43/006; F25B 2400/16
See application file for complete search history.

(56) References Cited

U.S. PATENT DOCUMENTS

| 4,177,145 A | 12/1979 | Schumacher | |
|---|---|---|---|
| 2021/0348814 A1* | 11/2021 | Gao | ........................ F25B 41/22 |

FOREIGN PATENT DOCUMENTS

| CN | 2898730 Y | 5/2007 |
|---|---|---|
| CN | 105937821 A | 9/2016 |
| CN | 206094679 U | 4/2017 |
| CN | 106679249 A | 5/2017 |
| CN | 208365880 U | 1/2019 |
| CN | 111238097 A | 6/2020 |
| JP | 2001153502 A | 6/2001 |

* cited by examiner

*Primary Examiner* — Elizabeth J Martin
(74) *Attorney, Agent, or Firm* — Samson G. Yu

(57) ABSTRACT

A gas-liquid separator and a compression system are provided. An outer cylinder, a filter assembly and a one-way valve are disposed in the gas-liquid separator; an upper part of the outer cylinder is provided with an inlet, and a lower part of the outer cylinder is provided with an outlet; the filter assembly includes a filter screen and a support, the support is provided with a valve port; and the one-way valve, the one-way valve includes a sealing member, the sealing member is located on a side of the support that is away from the filter screen, the sealing member is movably disposed to open or close the valve port, and when a pressure difference between a region above the support and a region below the support reaches a predetermined value, the valve port is opened to realize unidirectional communication between the inlet and the outlet.

18 Claims, 4 Drawing Sheets

GAS-LIQUID SEPARATOR AND COMPRESSION SYSTEM

CROSS-REFERENCE TO RELATED APPLICATION

The disclosure is a national stage application of International Patent Application No. PCT/CN2020/108666, which is filed on Aug. 12, 2020. The disclosure claims the priority of Chinese Patent Application No. 201910980192.X, filed on Oct. 15, 2019 and entitled "Gas-Liquid Separator and Compression System".

TECHNICAL FIELD

The disclosure relates to the technical field of gas-liquid separators, and in particular to a gas-liquid separator and a compression system.

BACKGROUND

A compression system includes a gas-liquid separator and a compressor, which communicate with each other, gas-liquid mixed fluid is separated by the gas-liquid separator, and a separated gas enters the compressor for compression. After the compressor is shut down, a part of high-pressure gas inside the compressor will return into the gas-liquid separator and is discharged from the gas-liquid separator to other pipelines or equipment, which will take a relatively long time to start the compressor again, thus affecting the working efficiency.

SUMMARY

The disclosure provides a gas-liquid separator and a compression system, so as to shorten a start-up time of a compressor.

According to one aspect of the disclosure, some embodiments of the disclosure provide a gas-liquid separator, including: an outer cylinder, wherein an upper part of the outer cylinder is provided with an inlet, and a lower part of the outer cylinder is provided with an outlet; a filter assembly disposed in the outer cylinder, wherein the filter assembly includes a filter screen and a support, the support is connected with the outer cylinder, the filter screen is disposed on the support, and the support is provided with a valve port; and a one-way valve disposed on the support, wherein the one-way valve is located below the filter screen, the one-way valve includes a sealing member, the sealing member is located on a side, away from the filter screen, of the support, the sealing member is movably to open or close the valve port, and when a pressure difference between a region above the support and a region below the support reaches a predetermined value, the valve port is opened to realize unidirectional communication between the inlet and the outlet.

In some embodiments, the one-way valve further includes: a connecting piece movably disposed on the support, wherein the sealing member is disposed on the connecting piece; and an elastic piece, disposed on the support, wherein the elastic piece is cooperated with the connecting piece.

In some embodiments, the connecting piece includes: a connecting rod, wherein the connecting rod passes through the sealing member; and a first plate body, wherein the first plate body is disposed on an upper end of the connecting rod, and a lower end of the elastic piece abuts against the support, and an upper end of the elastic piece abuts against the first plate body.

In some embodiments, the connecting piece further includes: a second plate body, wherein the second plate body is disposed on a lower end of the connecting rod, the second plate body is located on a side, away from the support, of the sealing member, and the second plate body is connected with the sealing member.

In some embodiments, the gas-liquid separator further includes: an output pipe, wherein the output pipe passes through the outlet of the outer cylinder, the output pipe is used for outputting a separated gas, and a radial area of the valve port is greater than a radial area of a gas channel of the output pipe.

In some embodiments, the support is provided with a plurality of through holes disposed at intervals, the plurality of through holes constitute the valve port, the sealing member is of a plate-shaped structure, and the sealing member is able to open or close the plurality of through holes.

In some embodiments, the gas-liquid separator further includes: a guide sleeve disposed on the support, the connecting rod is movably inserted into the guide sleeve, the elastic piece includes a spring, and the elastic piece sleeves on the guide sleeve.

In some embodiments, the filter screen is of an arc-shaped structure, the support is provided with a limiting groove, and a periphery of the filter screen is located in the limiting groove.

In some embodiments, the support includes an annular structure and a support plate disposed on the annular structure, the annular structure is cooperated with an inner wall of the outer cylinder, the support plate is provided with the valve port, and both the filter screen and the one-way valve are disposed on the support plate.

According to another aspect of the disclosure, a compression system is provided. The compression system includes a compressor and a gas-liquid separator, an outlet of the gas-liquid separator communicates with a gas inlet of the compressor, and the gas-liquid separator is the gas-liquid separator provided above.

By applying the technical solution of the disclosure, the outer cylinder, the filter assembly and the one-way valve are disposed in the gas-liquid separator, the upper part of the outer cylinder is provided with the inlet, and the lower part of the outer cylinder is provided with the outlet; the filter assembly is disposed in the outer cylinder, the filter assembly includes the filter screen and the support, the support is connected with the outer cylinder, the filter screen is disposed on the support, and the support is provided with the valve port; and the one-way valve is disposed on the support, the one-way valve is located below the filter screen, the one-way valve includes the sealing member, the sealing member is located on the side, away from the filter screen, of the support, the sealing member is movably to open or close the valve port, and when the pressure difference between the region above the support and the region below the support reaches the predetermined value, the valve port is opened to realize unidirectional communication between the inlet and the outlet. By the above settings, when the pressure in the region above the support is greater than the pressure in the region below the support and the pressure difference reaches the predetermined value, the one-way valve is able to open the valve port for gas-liquid separation of mixed fluid. In other cases, the one-way valve is able to close the valve port, so as to avoid the reverse flow of the gas. The gas-liquid separator is applied to the compression system, after the compressor is shut down, the valve port of the gas-liquid separator is closed, so that the gas in the compressor is prevented from being discharged from the gas-liquid separator, thereby guaranteeing the pressure in the compressor. In this way, when the compressor is started again, a start-up speed is accelerated, and the start-up time is shortened.

BRIEF DESCRIPTION OF THE DRAWINGS

The drawings constituting a part of the disclosure are used for providing a further understanding of the disclosure, and exemplary embodiments of the disclosure and descriptions thereof are used for explaining the disclosure, but do not constitute improper limitations of the disclosure. In the drawings.

Figure 1:
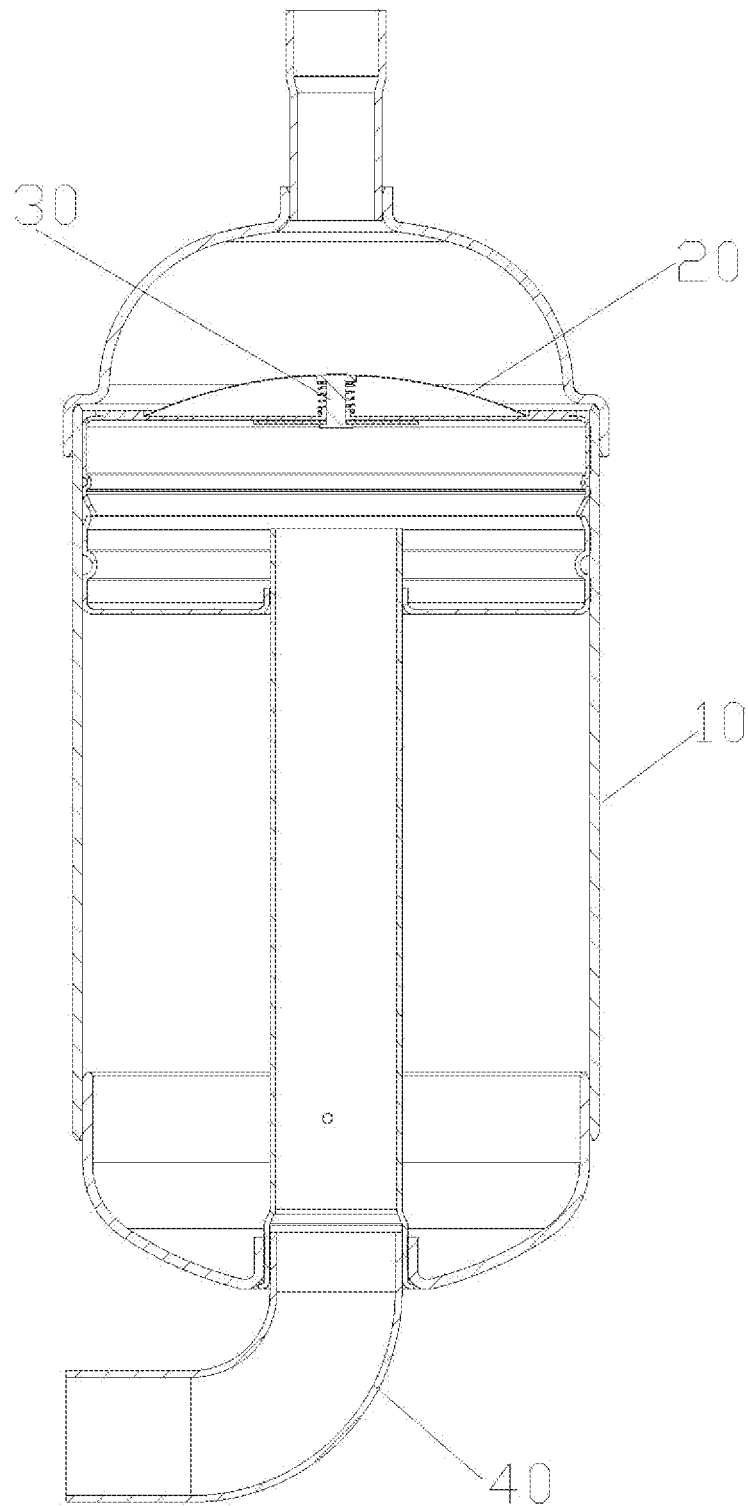
FIG. 1 shows a schematic structural diagram of a gas-liquid separator provided by an embodiment of the disclosure (a valve port is closed)
Figure 2:
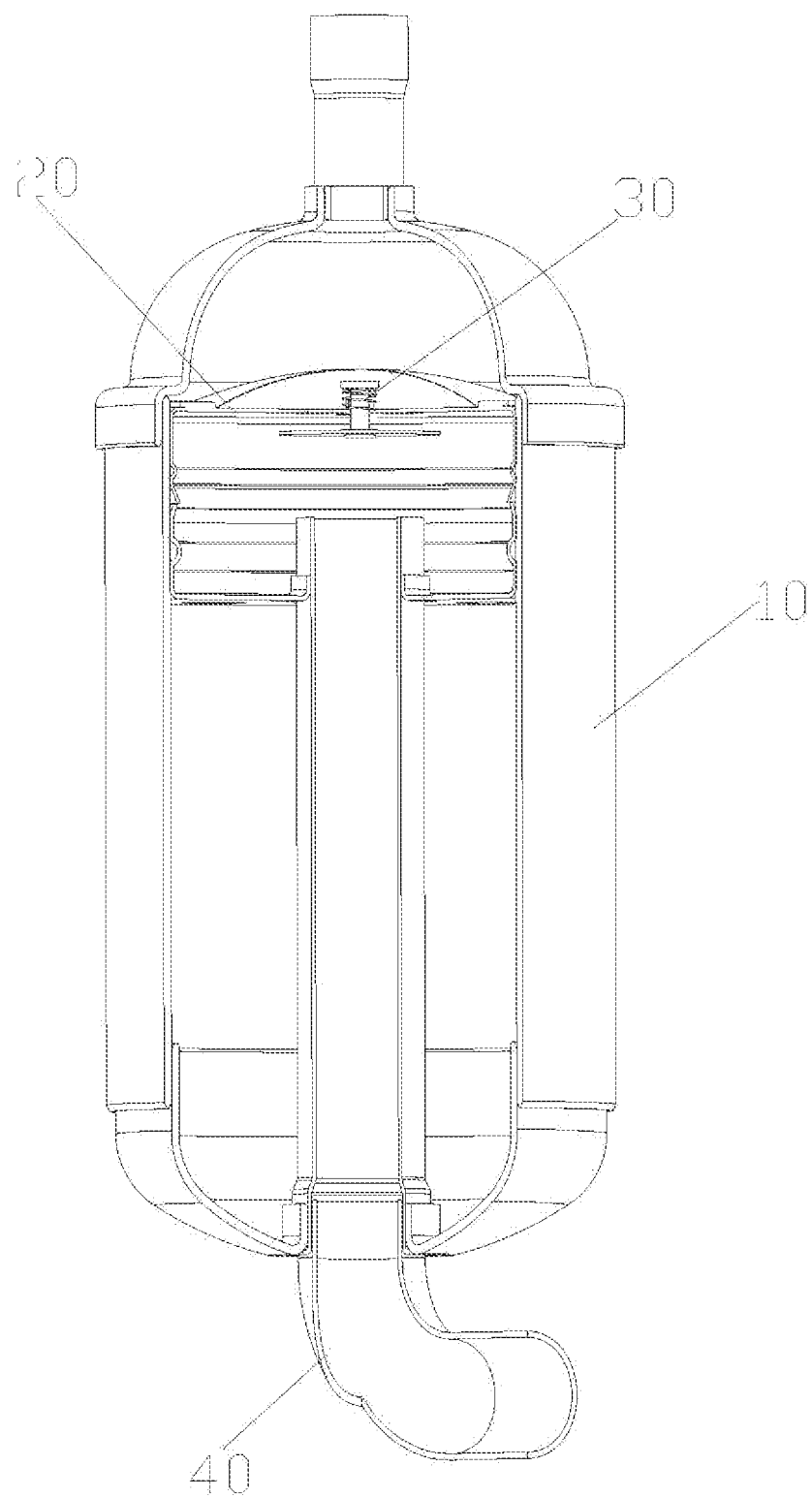
FIG. 2 shows another schematic structural diagram of the gas-liquid separator in FIG. 1 (the valve port is open)
Figure 3:
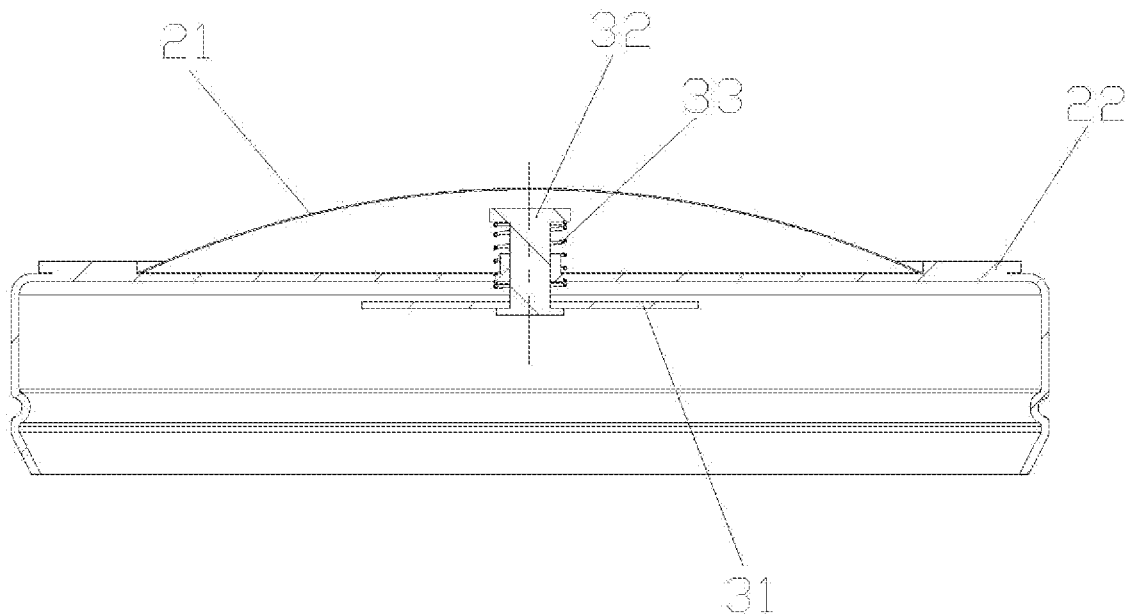
FIG. 3 shows an assembly diagram of a filter assembly and a one-way valve in FIG. 1.
Figure 4:
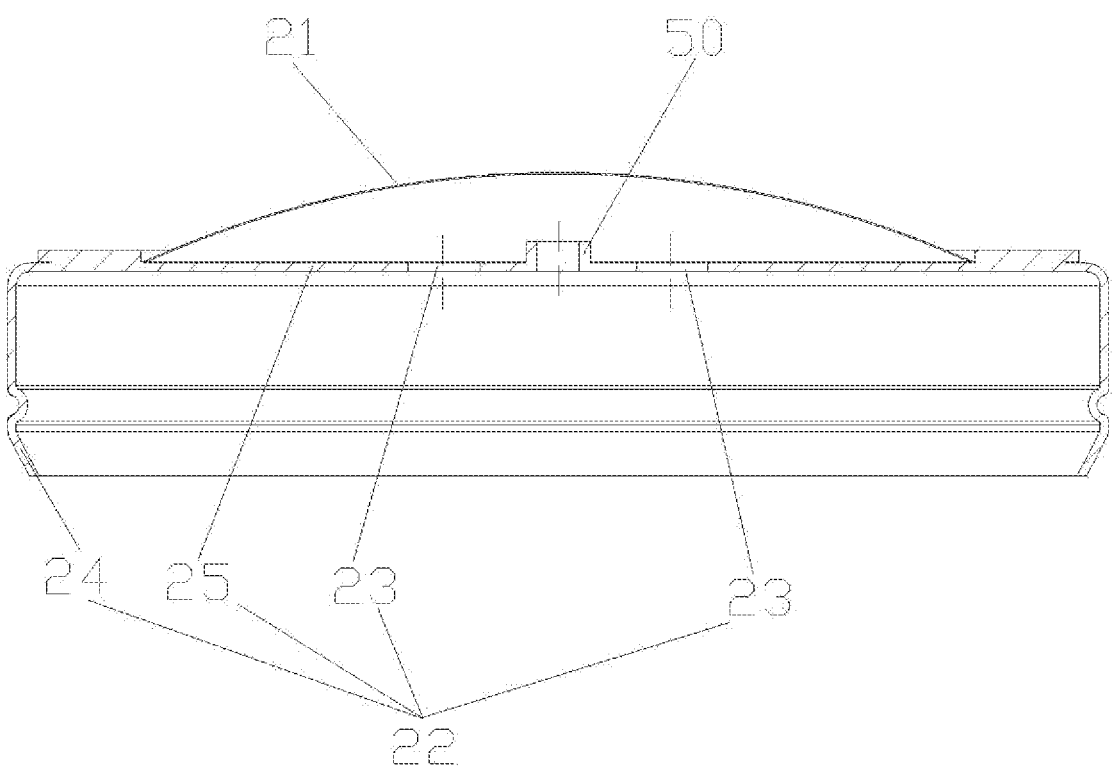
FIG. 4 shows a schematic structural diagram of the filter assembly in FIG. 1.
Figure 5:
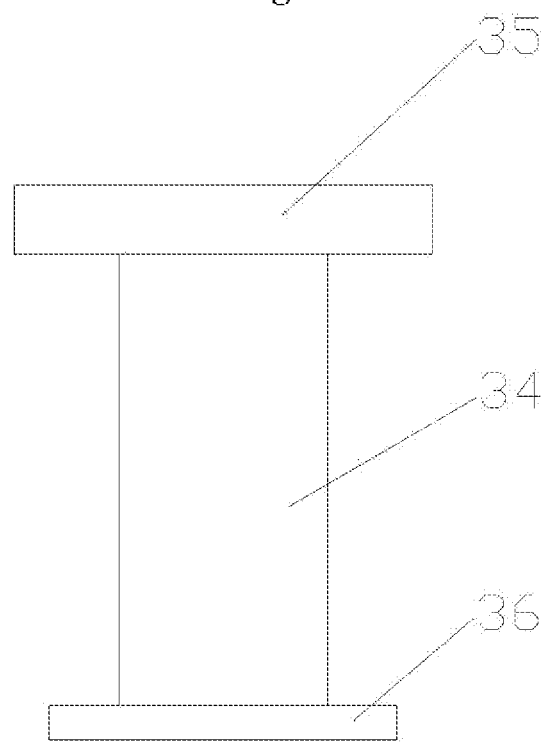
FIG. 5 shows a schematic diagram of a connecting piece in the one-way valve in FIG. 1.
Figure 6:
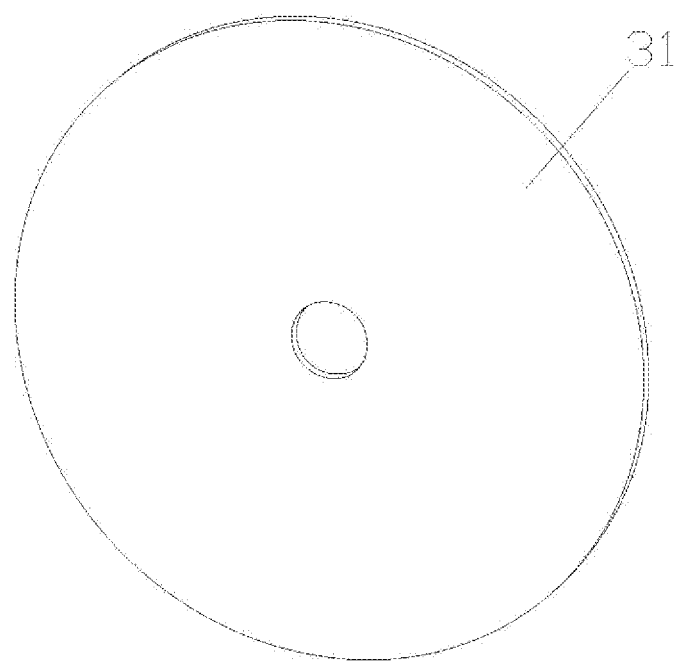
FIG. 6 shows a schematic diagram of a sealing member in the one-way valve in FIG. 1.

The above drawings include the following reference signs:
10. outer cylinder; 20. filter assembly; 21. filter screen; 22. support; 23. through hole; 24. annular structure; 25. support plate; 30. one-way valve; 31. sealing member; 32. connecting piece; 33. elastic piece; 34. connecting rod; 35. first plate body; 36. second plate body; 40. output pipe; 50. guide sleeve.

DETAILED DESCRIPTION OF THE EMBODIMENTS

A clear and complete description of technical solutions in the embodiments of the disclosure will be given below, in combination with the drawings in the embodiments of the disclosure. Apparently, the embodiments described below are merely a part, but not all, of the embodiments of the disclosure. The following description of at least one exemplary embodiment is merely illustrative and is in no way used as any limitation to the disclosure and its application or use. All of other embodiments, obtained by those of ordinary skill in the art based on the embodiments of the disclosure without any creative effort, fall into the protection scope of the disclosure.

As shown in the drawings, one embodiment of the disclosure provides a gas-liquid separator, including: an outer cylinder 10, wherein an upper part of the outer cylinder 10 is provided with an inlet, and a lower part of the outer cylinder 10 is provided with an outlet; a filter assembly 20 disposed in the outer cylinder 10, wherein the filter assembly 20 includes a filter screen 21 and a support 22, the support 22 is connected with the outer cylinder 10, the filter screen 21 is disposed on the support 22, and the support 22 is provided with a valve port; and a one-way valve 30 disposed on the support 22, wherein the one-way valve 30 is located below the filter screen 21, the one-way valve 30 includes a sealing member 31, the sealing member 31 is located on a side, away from the filter screen 21, of the support 22, the sealing member 31 is movably to open or close the valve port, and when a pressure difference between a region above the support 22 and a region below the support 22 reaches a predetermined value, the valve port is opened to realize unidirectional communication between the inlet and the outlet. Obviously, in other embodiments of the disclosure, the filter screen 21 can also be disposed below the valve port, and the filtering position of the filter screen 21 does not affect the implementation effect of the one-way valve 30 for controlling the on and off of the valve port.

By applying the technical solution of the disclosure, the outer cylinder 10, the filter assembly 20 and the one-way valve 30 are disposed in the gas-liquid separator, the upper part of the outer cylinder 10 is provided with the inlet, and the lower part of the outer cylinder 10 is provided with the outlet; the filter assembly 20 is disposed in the outer cylinder 10, the filter assembly 20 includes the filter screen 21 and the support 22, the support 22 is connected with the outer cylinder 10, the filter screen 21 is disposed on the support 22, and the support 22 is provided with the valve port; and the one-way valve 30 disposed on the support 22, the one-way valve 30 is located below the filter screen 21, the one-way valve 30 includes the sealing member 31, the sealing member 31 is located on the side, away from the filter screen 21, of the support 22, the sealing member 31 is movably to open or close the valve port, and when the pressure difference between the region above the support 22 and the region below the support 22 reaches the predetermined value, the valve port is opened to realize unidirectional communication between the inlet and the outlet. By the above settings, when the pressure in the region above the support 22 is greater than the pressure in the region below the support 22 and the pressure difference reaches the predetermined value, the one-way valve 30 is able to open the valve port for gas-liquid separation of mixed fluid. In other cases, the one-way valve 30 is able to close the valve port, so as to avoid the reverse flow of the gas. The gas-liquid separator is applied to a compression system, after a compressor is shut down, the valve port of the gas-liquid separator is closed, so that the gas in the compressor is prevented from being discharged from the gas-liquid separator, thereby guaranteeing the pressure in the compressor. In this way, when the compressor is started again, a start-up speed is accelerated, and a start-up time is shortened.

In the present embodiment, the one-way valve 30 further includes: a connecting piece 32 movably disposed on the support 22, wherein the sealing member 31 is disposed on the connecting piece 32; and an elastic piece 33 disposed on the support 22, wherein the elastic piece 33 is cooperated with the connecting piece 32. The connection between the sealing member 31 and the support 22 is realized by the connecting piece 32. By disposing the elastic piece 33, when a downward pressure on the sealing member 31 reaches a predetermined value, the sealing member 31 moves downward against an elastic force of the elastic piece 33, thereby opening the valve port; and when the downward pressure on the sealing member 31 is less than the predetermined value or when the sealing member is subjected to an upward pressure, the sealing member 31 is maintained at a position for sealing the valve port under the elastic force of the elastic piece 33. In some embodiments, the sealing member 31 and the connecting piece 32 are connected by welding or riveting.

In some embodiments, the connecting piece 32 includes: a connecting rod 34, wherein the connecting rod 34 passes through the sealing member 31; and a first plate body 35, wherein the first plate body 35 is disposed on an upper end of the connecting rod 34, and a lower end of the elastic piece 33 abuts against the support 22, and an upper end of the elastic piece 33 abuts against the first plate body 35. By the above settings, the elastic piece 33 is in a compressed state, so as to exert an upward acting force on the sealing member 31. In some embodiments, the elastic piece 33 is a spring.

In the present embodiment, the connecting piece 32 further includes: a second plate body 36, wherein the second plate body 36 is disposed on a lower end of the connecting rod 34, the second plate body 36 is located on a side, away from the support 22, of the sealing member 31, and the second plate body 36 is connected with the sealing member 31. By disposing the second plate body 36, the connection reliability between the connecting piece 32 and the sealing member 31 is improved. In some embodiments, the second plate body 36 and the first plate body 35 are both circular plates, and a diameter of the second plate body 36 and a diameter of the first plate body 35 are both greater than a diameter of the connecting rod 34.

In the present embodiment, the gas-liquid separator further includes: an output pipe 40, wherein the output pipe 40 passes through the outlet of the outer cylinder 10, the output pipe 40 is used for outputting a separated gas, and a radial area of the valve port is greater than a radial area of a gas channel of the output pipe 40. Since the radial area of the valve port is set to be greater than the radial area of the gas channel of the output pipe 40, smooth flow of the gas is guaranteed, and obstruction of the valve port on the flow of the gas is avoided.

In the present embodiment, the support 22 is provided with a plurality of through holes 23 disposed at intervals, the plurality of through holes 23 constitute the valve port, the sealing member 31 is of a plate-shaped structure, and the sealing member 31 is able to open or close the plurality of through holes 23. In this way, all the plurality of through holes 23 are used for allowing the fluid to pass through, so as to ensure the smooth flow of the fluid. By setting the sealing member 31 to be the plate-shaped structure, the plurality of through holes 23 are conveniently opened and closed.

In the present embodiment, the gas-liquid separator further includes: a guide sleeve 50 disposed on the support 22, the connecting rod 34 is movably inserted into the guide sleeve 50, the elastic piece 33 includes a spring, and the elastic piece 33 sleeves on the guide sleeve 50. By disposing the guide sleeve 50, the connecting rod 34 and the elastic piece 33 is guided and limited, thereby improving the reliability of the one-way valve 30.

In some embodiments, the guide sleeve 50 and the support 22 are of an integrated structure, so that the structural strength is improved.

In the present embodiment, the filter screen 21 is of an arc-shaped structure, the support 22 is provided with a limiting groove, and a periphery of the filter screen 22 is located in the limiting groove. By the above settings, the filter screen 22 is limited by the limiting groove. In some embodiments, the filter screen 21 is welded with the support 22, and the limiting groove is filled with solder for welding.

In the present embodiment, the support 22 includes an annular structure 24 and a support plate 25 disposed on the annular structure 24, the annular structure 24 is cooperated with an inner wall of the outer cylinder 10, the support plate 25 is provided with the valve port, and both the filter screen 21 and the one-way valve 30 are disposed on the support plate 25. A reliable connection with the outer cylinder 10 is realized by the annular structure, and the filter screen 21 is supported by the support plate 25.

In some embodiments, the outer cylinder 10 includes an upper cover, a middle cylinder and a lower cover, which are connected in sequence. The gas-liquid separator further includes an input pipe, and the input pipe passes through the inlet of the outer cylinder 10. The gas-liquid separator further includes a limiting ring, the limiting ring is disposed in the outer cylinder 10, and a end of the output pipe 40 passes through the limiting ring, so as to limit the output pipe 40 by the limiting ring. In this way, the stability of the output pipe 40 is improved.

Another embodiment of the disclosure provides a compression system. The compression system includes a compressor and a gas-liquid separator, an outlet of the gas-liquid separator communicates with a gas inlet of the compressor, and the gas-liquid separator is the gas-liquid separator described above. The outer cylinder 10, the filter assembly 20 and the one-way valve 30 are disposed in the gas-liquid separator, the upper part of the outer cylinder 10 is provided with the inlet, and the lower part of the outer cylinder 10 is provided with the outlet; the filter assembly 20 is disposed in the outer cylinder 10, the filter assembly 20 includes the filter screen 21 and the support 22, the support 22 is connected with the outer cylinder 10, the filter screen 21 is disposed on the support 22, and the support 22 is provided with the valve port; and the one-way valve 30 disposed on the support 22, the one-way valve 30 is located below the filter screen 21, the one-way valve 30 includes the sealing member 31, the sealing member 31 is located on the side, away from the filter screen 21, of the support 22, the sealing member 31 is movably to open or close the valve port, and when the pressure difference between the region above the support 22 and the region below the support 22 reaches a predetermined value, the valve port is opened to realize unidirectional communication between the inlet and the outlet. By the above settings, when the pressure in the region above the support 22 is greater than the pressure in the region below the support 22 and the pressure difference reaches the predetermined value, the one-way valve 30 is able to open the valve port for gas-liquid separation of mixed fluid. In other cases, the one-way valve 30 is able to close the valve port, so as to avoid the reverse flow of the gas. The gas-liquid separator is applied to the compression system, after the compressor is shut down, the valve port of the gas-liquid separator is closed, so that the gas in the compressor is prevented from being discharged from the gas-liquid separator, thereby guaranteeing the pressure in the compressor. In this way, when the compressor is started again, the start-up speed is accelerated, and the start-up time is shortened.

The above descriptions are only some embodiments of the disclosure, and are not intended to limit the disclosure. For those skilled in the art, the disclosure is able to have various modifications and changes. Any modifications, equivalent replacements, improvements and the like, made within the spirit and principles of the disclosure, shall all fall within the protection scope of the disclosure.

What is claimed is:
1. A gas-liquid separator, comprising:
an outer cylinder, wherein an upper part of the outer cylinder is provided with an inlet, and a lower part of the outer cylinder is provided with an outlet;
a filter assembly disposed in the outer cylinder, wherein the filter assembly comprises a filter screen and a support, the support is connected with the outer cylin- der, the filter screen is disposed on the support, and the support is provided with a valve port; and a one-way valve disposed on the support, wherein the one-way valve is located below the filter screen, the one-way valve comprises a sealing member, the sealing member is located on a side of the support that is away from the filter screen, the sealing member is movably to open or close the valve port, and when a pressure difference between a region above the support and a region below the support reaches a predetermined value, the valve port is opened to realize unidirectional communication between the inlet and the outlet.

2. The gas-liquid separator as claimed in claim 1, wherein the one-way valve further comprises:

a connecting piece movably disposed on the support, wherein the sealing member is disposed on the connecting piece; and an elastic piece disposed on the support, wherein the elastic piece is cooperated with the connecting piece.

3. The gas-liquid separator as claimed in claim 2, wherein the connecting piece comprises:

a connecting rod, wherein the connecting rod passes through the sealing member; and a first plate body, wherein the first plate body is disposed on an upper end of the connecting rod, and a lower end of the elastic piece abuts against the support, and an upper end of the elastic piece abuts against the first plate body.

4. The gas-liquid separator as claimed in claim 3, wherein the connecting piece further comprises:

a second plate body, wherein the second plate body is disposed on a lower end of the connecting rod, the second plate body is located on a side of the sealing member that is away from the support, and the second plate body is connected with the sealing member.

5. The gas-liquid separator as claimed in claim 3, wherein the gas-liquid separator further comprises:

a guide sleeve disposed on the support, the connecting rod is movably inserted into the guide sleeve, the elastic piece comprises a spring, and the elastic piece sleeves on the guide sleeve.

6. The gas-liquid separator as claimed in claim 1, wherein the gas-liquid separator further comprises:

an output pipe, wherein the output pipe passes through the outlet of the outer cylinder, the output pipe is used for outputting a separated gas, and a radial area of the valve port is greater than a radial area of a gas channel of the output pipe.

7. The gas-liquid separator as claimed in claim 6, wherein the support is provided with a plurality of through holes disposed at intervals, the plurality of through holes constitute the valve port, the sealing member is of a plate-shaped structure, and the sealing member is able to open or close the plurality of through holes.

8. The gas-liquid separator as claimed in claim 1, wherein the filter screen is of an arc-shaped structure, the support is provided with a limiting groove, and a periphery of the filter screen is located in the limiting groove.

9. The gas-liquid separator as claimed in claim 1, wherein the support comprises an annular structure and a support plate disposed on the annular structure, the annular structure is cooperated with an inner wall of the outer cylinder, the support plate is provided with the valve port, and both the filter screen and the one-way valve are disposed on the support plate.

10. A compression system, wherein the compression system comprises the gas-liquid separator as claimed in claim 1 and a compressor, the outlet of the gas-liquid separator communicates with a gas inlet of the compressor.

11. The compression system as claimed in claim 10, wherein the one-way valve further comprises:

a connecting piece movably disposed on the support, wherein the sealing member is disposed on the connecting piece; and an elastic piece disposed on the support, wherein the elastic piece is cooperated with the connecting piece.

12. The compression system as claimed in claim 11, wherein the connecting piece comprises:

a connecting rod, wherein the connecting rod passes through the sealing member; and a first plate body, wherein the first plate body is disposed on an upper end of the connecting rod, and a lower end of the elastic piece abuts against the support, and an upper end of the elastic piece abuts against the first plate body.

13. The compression system as claimed in claim 12, wherein the connecting piece further comprises:

a second plate body, wherein the second plate body is disposed on a lower end of the connecting rod, the second plate body is located on a side of the sealing member that is away from the support, and the second plate body is connected with the sealing member.

14. The compression system as claimed in claim 12, wherein the gas-liquid separator further comprises:

a guide sleeve disposed on the support, the connecting rod is movably inserted into the guide sleeve, the elastic piece comprises a spring, and the elastic piece sleeves on the guide sleeve.

15. The compression system as claimed in claim 10, wherein the gas-liquid separator further comprises:

an output pipe, wherein the output pipe passes through the outlet of the outer cylinder, the output pipe is used for outputting a separated gas, and a radial area of the valve port is greater than a radial area of a gas channel of the output pipe.

16. The compression system as claimed in claim 15, wherein the support is provided with a plurality of through holes disposed at intervals, the plurality of through holes constitute the valve port, the sealing member is of a plate-shaped structure, and the sealing member is able to open or close the plurality of through holes.

17. The compression system as claimed in claim 10, wherein the filter screen is of an arc-shaped structure, the support is provided with a limiting groove, and a periphery of the filter screen is located in the limiting groove.

18. The compression system as claimed in claim 10, wherein the support comprises an annular structure and a support plate disposed on the annular structure, the annular structure is cooperated with an inner wall of the outer cylinder, the support plate is provided with the valve port, and both the filter screen and the one-way valve are disposed on the support plate.

* * * * *